United States Patent [19]
Carmody

[11] Patent Number: 5,324,048
[45] Date of Patent: Jun. 28, 1994

[54] MECHANICAL SEALS

[75] Inventor: Christopher J. Carmody, Conisbrough, England

[73] Assignee: AES Engineering Limited, South Yorkshire, England

[21] Appl. No.: 958,048

[22] Filed: Oct. 6, 1992

[30] Foreign Application Priority Data

Oct. 10, 1991 [GB] United Kingdom ............... 9121570

[51] Int. Cl.⁵ .................... F16J 15/34; F16J 15/36
[52] U.S. Cl. ..................................... 277/38; 277/42; 277/81 R; 277/88; 277/93 R
[58] Field of Search .................... 277/38–43, 277/81 R, 88, 89, 93 R, 93 SD

[56] References Cited

U.S. PATENT DOCUMENTS

| | | | |
|---|---|---|---|
| 1,866,967 | 7/1932 | Durham | 277/42 |
| 4,509,762 | 4/1985 | Garrett | 277/41 X |
| 4,538,821 | 9/1985 | Wallace | 277/81 R |
| 4,688,807 | 8/1987 | Warner | 277/81 R X |
| 4,971,337 | 11/1990 | Hufford | 277/93 SD |
| 5,213,340 | 5/1993 | Azibert et al. | 277/93 SD X |

FOREIGN PATENT DOCUMENTS

| | | | |
|---|---|---|---|
| 8902999 | 4/1989 | PCT Int'l Appl. | 277/38 |
| 9207207 | 4/1992 | PCT Int'l Appl. | 277/38 |
| 2111139 | 6/1983 | United Kingdom | |
| 2215412 | 9/1989 | United Kingdom | |

Primary Examiner—William A. Cuchlinski, Jr.
Assistant Examiner—Scott W. Cummings
Attorney, Agent, or Firm—Edwin D. Schindler

[57] ABSTRACT

The invention provides a sleeve for a cartridge-mounted mechanical seal, the sleeve being formed from two connected-together metallic components. The first component is made from a material having a relatively high chemical resistance, the second from a material having a relatively lower chemical resistance. The arrangement of the components is such that, in use as part of a seal, the sleeve has only its first component in contact with the fluid whose escape is being sealed. Such a sleeve is easier and cheaper to produce than one made entirely from a high chemical resistance material, and yet just as effective in use. The invention also provides a seal including such a sleeve.

23 Claims, 17 Drawing Sheets

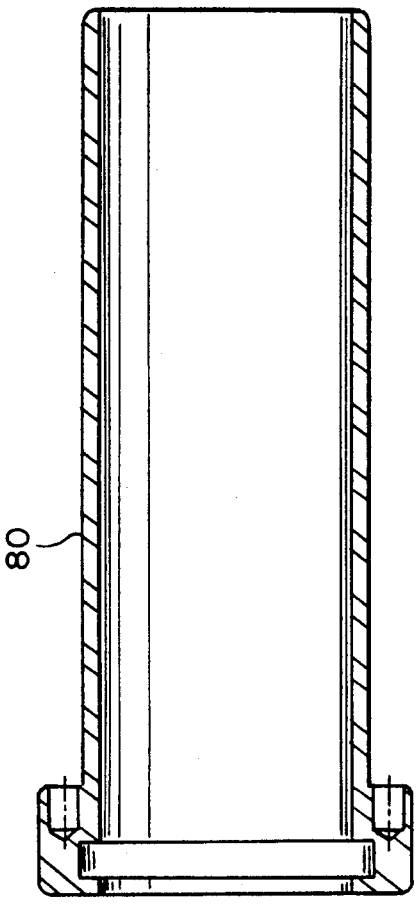
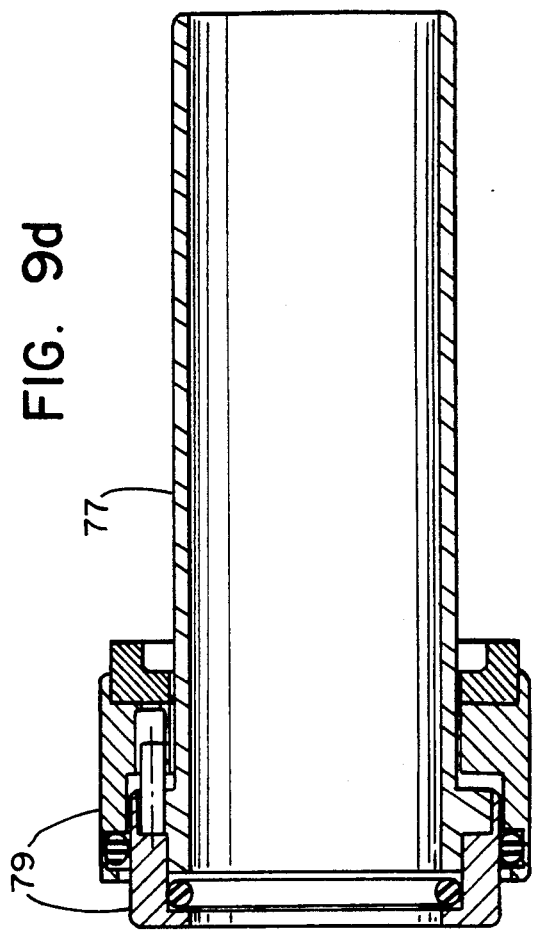
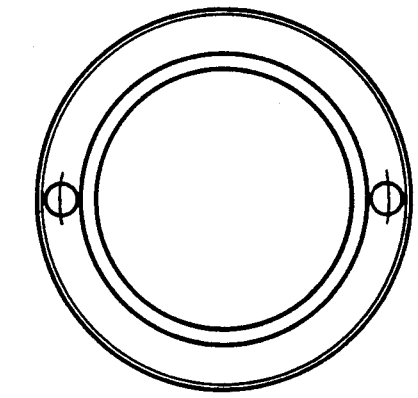
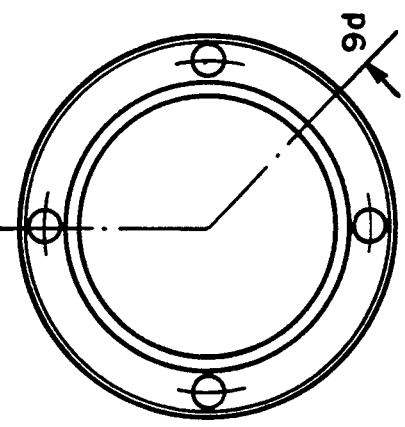

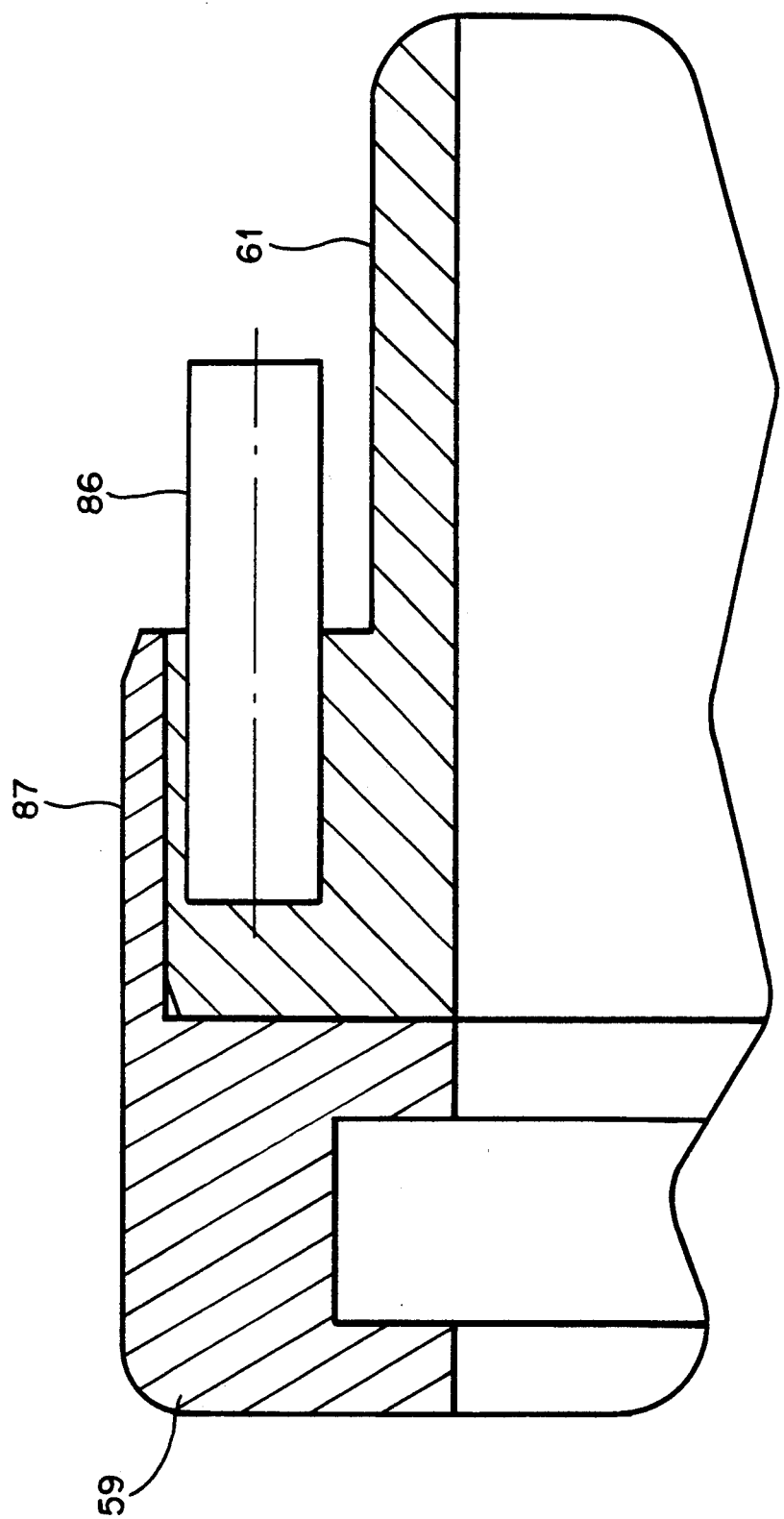

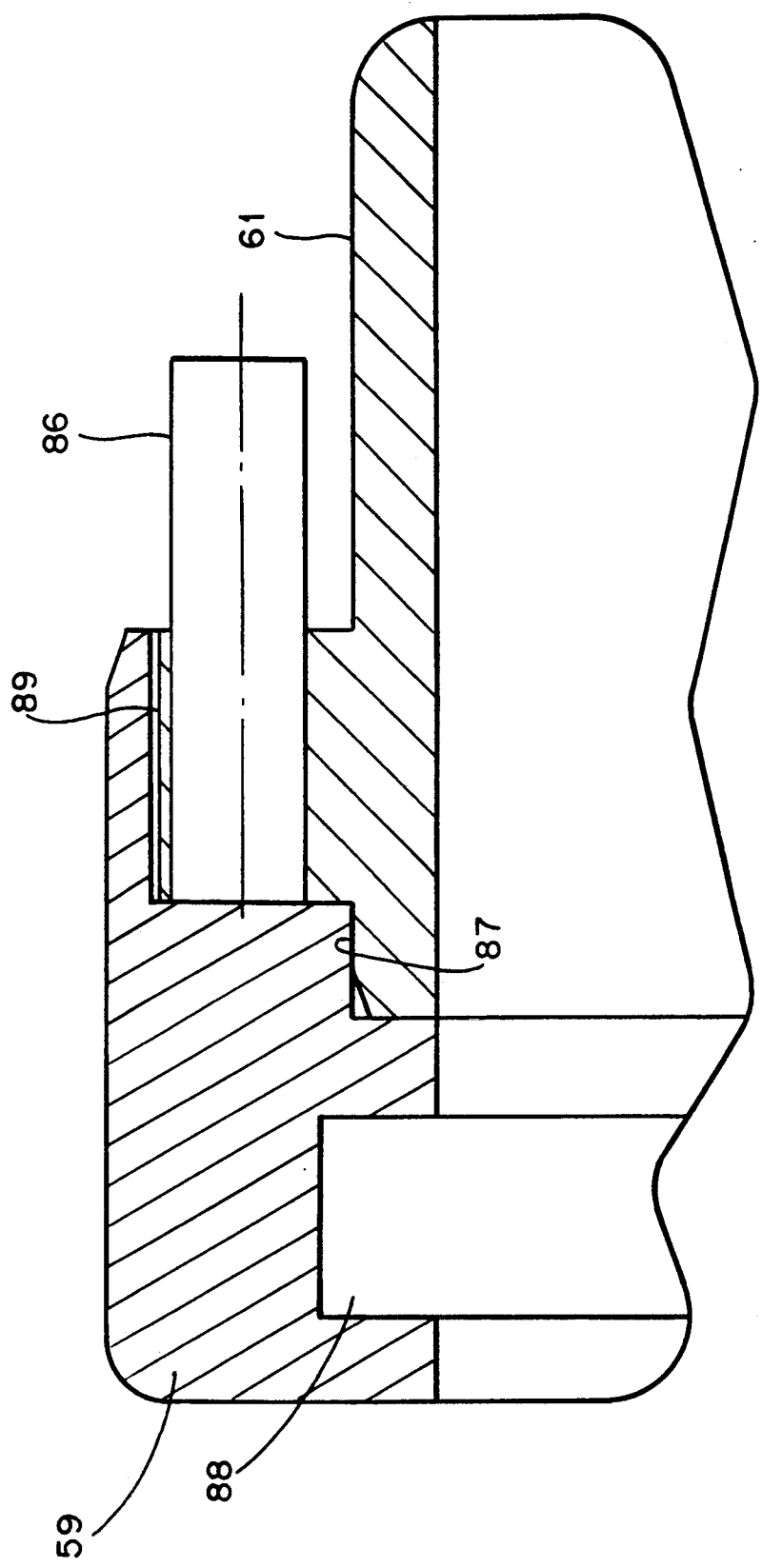

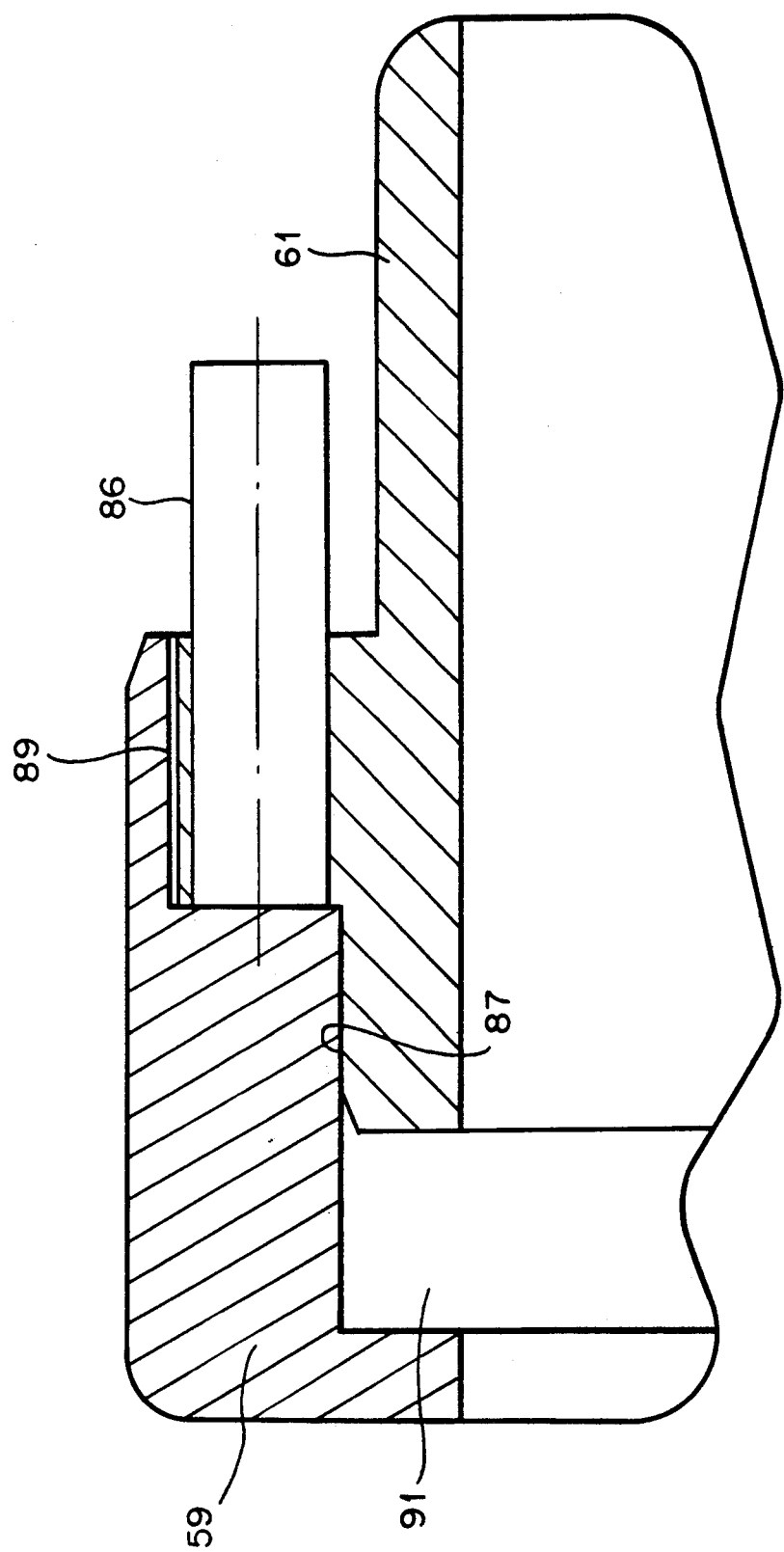

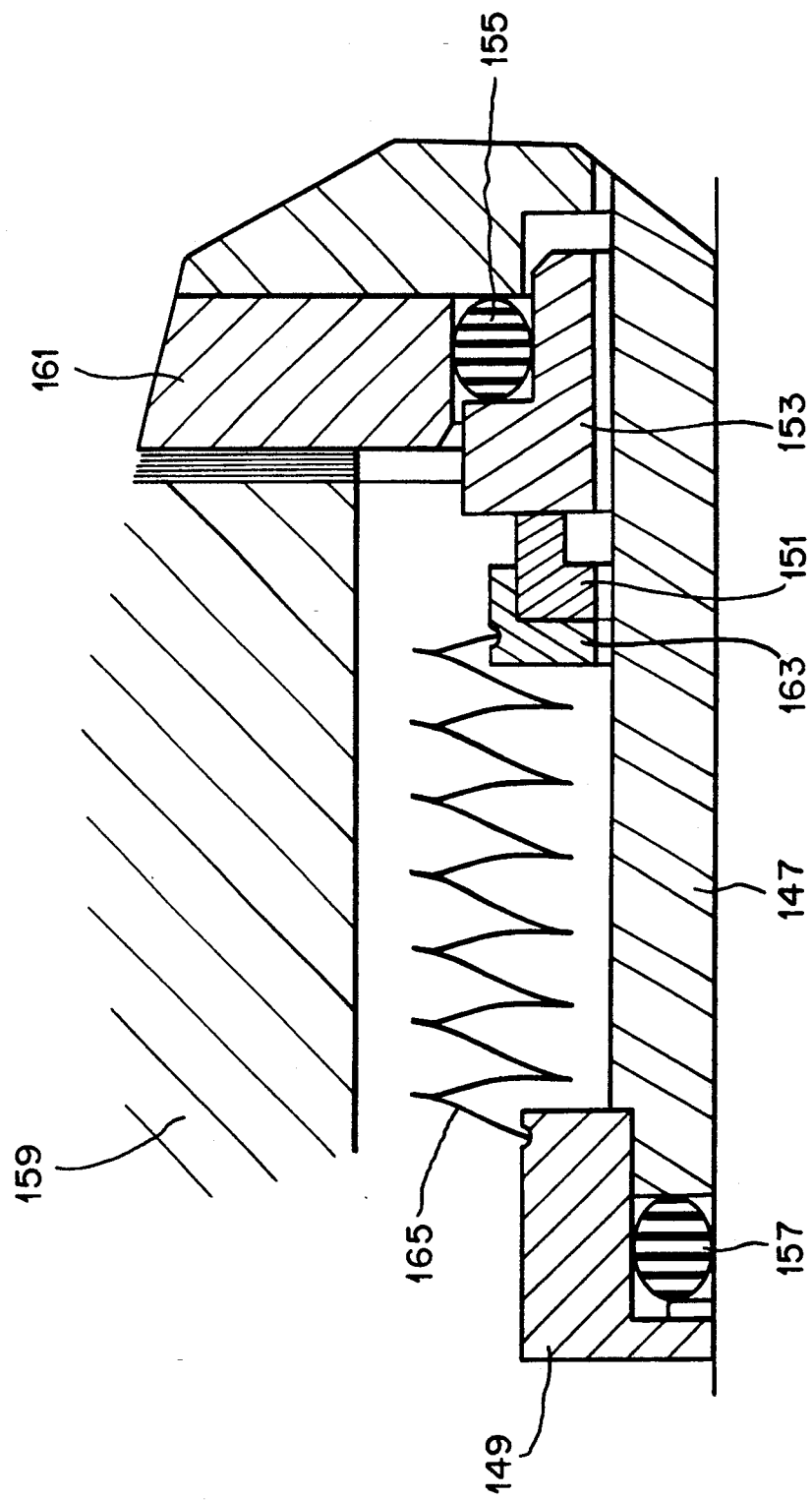

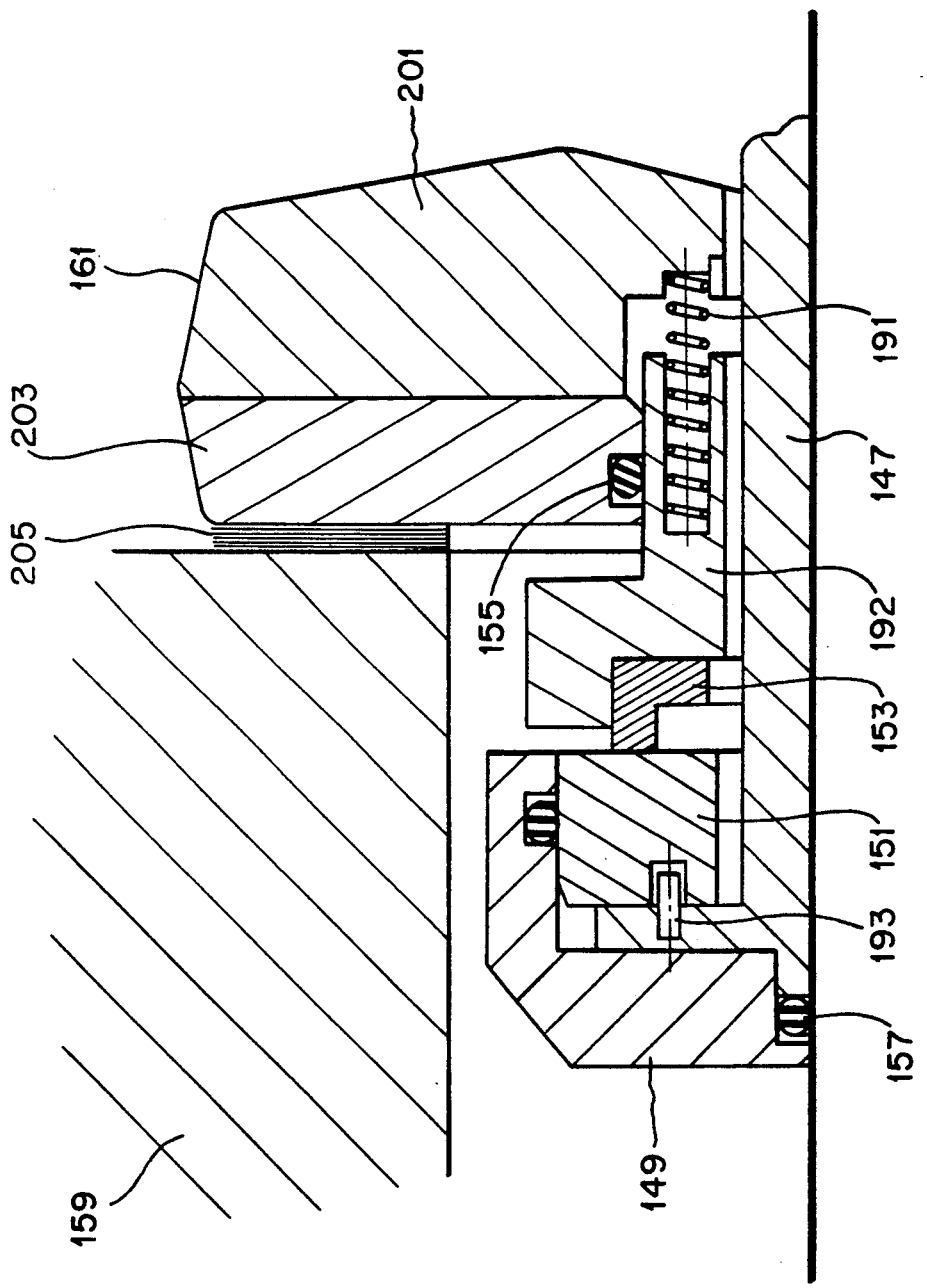

MECHANICAL SEALS

This invention relates to mechanical seals, which are devices used for preventing fluid leakage from pumps, mixing vessels, gear boxes and other pieces of equipment where fluid is situated between stationary and rotating parts.

A mechanical seal is normally located in a seal cavity which is situated, for instance, where a rotating shaft enters the stationary part of the equipment. It typically comprises two parts, one termed the "rotary" which is fixed to the rotating shaft, and the other termed the "stationary" which is fixed to the body of the equipment.

Typically, mechanical seals consist of a number of components: as a result, it is difficult and time consuming to install them properly. Problems are encountered in setting the seals to their correct working lengths and in protecting the seal components (to avoid soiling and damage) during assembly. As a result, so-called cartridge-mounted mechanical seals, which are factory-assembled to form pre-set units and do not require installation measurements to be taken on fitting, have become increasingly popular.

Typically, cartridge-mounted mechanical seals include a stainless steel sleeve which forms an inner cylindrical member which, in use, surrounds the rotating shaft. At one end of the sleeve, there is provided a groove to accommodate an 'O' ring between the sleeve and the shaft. Such an 'O' ring groove is normally provided in an enlarged end-portion of the sleeve.

Although stainless steel has been commonly used in the past for manufacturing the sleeves of cartridge-mounted mechanical seals, use has also been made of expensive alloy materials, particularly in the case where the fluids involved are highly toxic and/or corrosive. Cartridge seals having such a sleeve are described as having "non-metallic wetted parts", although the parts in question are, in fact, normally made of a high nickel content special alloy such as Hastelloy B or C, Monel, Nickel 200 or Carpenter 20. The seal faces themselves would be made of carbon, alumina, ceramic or silicon carbide.

The price of the special alloys may be about ten times the price of stainless steel and they are only available in solid round bar form, in very few sizes. As a result, there is typically three times as much wasted material when producing a seal sleeve out of such a special alloy as compared with producing it from stainless steel. The special alloys also have much lower cutting speeds relative to stainless steel, with the result that the turning and boring operations needed to produce the sleeve take much longer (typically three times as long) using the alloys than using stainless steel.

According to a first aspect of the present invention, there is provided a sleeve for a cartridge-mounted mechanical seal, the sleeve being formed from two connected-together metallic components, the first component forming one end of the sleeve and providing at least part of a groove for an 'O' ring, said first component being made from a material having relatively high chemical resistance, and a second component forming the remainder of the sleeve and being formed of a material having a relatively lower chemical resistance, the arrangement of the components being such that, in use as part of a cartridge-mounted mechanical seal, the sleeve has only its first component in contact with the fluid whose escape is being sealed.

Such a sleeve, whilst being cheaper and less time-consuming to produce than a sleeve made entirely or almost entirely from a material of high chemical resistance, is functionally as useful, in that the fluid being sealed still only contacts those parts of the sleeve made from the chemically resistant material.

The first component of the sleeve is preferably made from a high nickel-content alloy such as Hastelloy B or C, Monel, Nickel 200 or Carpenter 20. It could alternatively be made from another chemically resistant material, such as titanium. The second component is conveniently made from stainless steel, preferably 316 Stainless Steel or an equivalent product.

The first and second components may be connected together in any appropriate manner, such as by welding or shrink-fitting or by means of bolts. Shrink-fitting is generally the preferred method.

The present invention provides, as a second aspect, a cartridge-mounted mechanical seal including a sleeve in accordance with the first aspect of the invention.

Such a seal will typically also include a rotary component and a stationary component, both mounted on the sleeve, and usually an integral gland plate for connection to the casing of equipment in which the seal is to be used. The seal will also desirably include drive means for driving the rotary component, to ensure that, in use, it rotates in synchronisity with a rotating shaft around which the sleeve is mounted. The drive means conveniently comprises one or more drive pins, mounted on the sleeve, which are in driving engagement with the rotary component of the seal.

The drive pin or pins may be mounted on either the first or the second component of the sleeve. However, where the two components are shrink-fitted together, it is desirable that the drive pin(s) be mounted on the second component of the sleeve, so that the shrink-fit interference between the components does not form part of the drive mechanism for the rotary component.

The stationary component of the seal may be pivotally mounted in the seal so as to allow a degree of pivotal movement, when the seal is in use, of the stationary component relative to the stationary parts of an item of equipment in which the seal is used, about an axis perpendicular to the longitudinal axis of the seal, and hence maintain the stationary and rotary components of the seal substantially in alignment despite any out-of-squareness in the equipment.

In this case, the seal incorporates a so-called "self-aligning stationary", which is capable of aligning to the rotary component of the seal, thus compensating for any out-of-squareness (i.e. between rotating and stationary parts) in the equipment in which the seal is used. Whilst the rotary component of the seal, in use, rotates with the rotating parts of the equipment, the stationary component of the seal is not completely fixed relative to the stationary parts of the equipment, and can thus remain aligned to the rotary component of the seal (maintaining contact between the stationary and rotary seal faces) whatever the relative positions of rotating and stationary parts of the equipment.

The stationary component will typically be mounted about one or more pivot pins, conveniently set in a pivot ring, the pivot ring itself being mounted about one or more pins in a gland plate or other part of the seal which, in use, remains fixed in position relative to stationary parts of the equipment, the arrangement being such as to allow the necessary degree of pivotal movement, in use, of the stationary component.

A self-aligning stationary of the type referred to is already known, having been described in our European Patent No. EP-0,098,747B. The teachings of that document, regarding seals with self-aligning stationary faces, are intended to be incorporated by reference in the present document, and any seal described in EP-0,098,747B, but comprising a sleeve in accordance with the first aspect of the present invention, falls within the scope of the second aspect of the present invention.

Other types of self-aligning stationary are also possible; these too could be included in a seal in accordance with the present invention.

A seal having a self-aligning stationary may also include drive means for driving the rotary component to ensure that it rotates, in use, in synchrony with a rotating shaft around which the seal sleeve is mounted.

A seal in accordance with the second aspect of the invention may comprise a rotary component and a stationary component having adjacent faces; and biassing means acting to urge the rotary and stationary component faces into constant mating contact with one another during use of the seal.

The biassing means may act against either the rotary or the stationary component of the seal. It may, for example, take the form of a spring or springs acting to urge the two component faces into contact with one another. Alternatively, the biassing means may comprise bellows, which act against one of the components to urge it into contact with the other.

In such a seal, mating contact between the faces of the stationary and rotary components is automatically maintained. Moreover, fluctuations in pressure of the liquid under seal, which might otherwise disturb the alignment of the faces, are automatically compensated for.

Where the biassing means comprises bellows, the convolutions of the bellows may be of any suitable shape, depending on the levels of flexibility and strength required of them. For instance, the bellows may have a repeating V profile, a repeating U profile, etc.

The bellows may be made from metal, preferably from a metal or metal alloy having a relatively high chemical resistance, for instance stainless steel, exotic alloys such as Hastelloy C, etc . . . . They are typically welded to the rotary or stationary component of the seal, whichever they act against, or to a holder in which that component is mounted.

At their end remote from the seal component against which they act in use, the bellows may be welded directly to the seal sleeve at an appropriate point towards the inside (i.e. inside the product being sealed) end.

It is clear from the above that a seal in accordance with the second aspect of the present invention may comprise any conventional seal components, such as a self-aligning stationary or a rotary or stationary biassing means, mounted on a bi-metal sleeve in accordance with the first aspect of the invention.

A sleeve or a seal in accordance with the invention may also form part of a double cartridge-mounted mechanical seal having both inboard and outboard rotary and stationary components.

The invention will now be further described, by way of illustration only, with reference to the accompanying drawings, in which.

Figure 10:
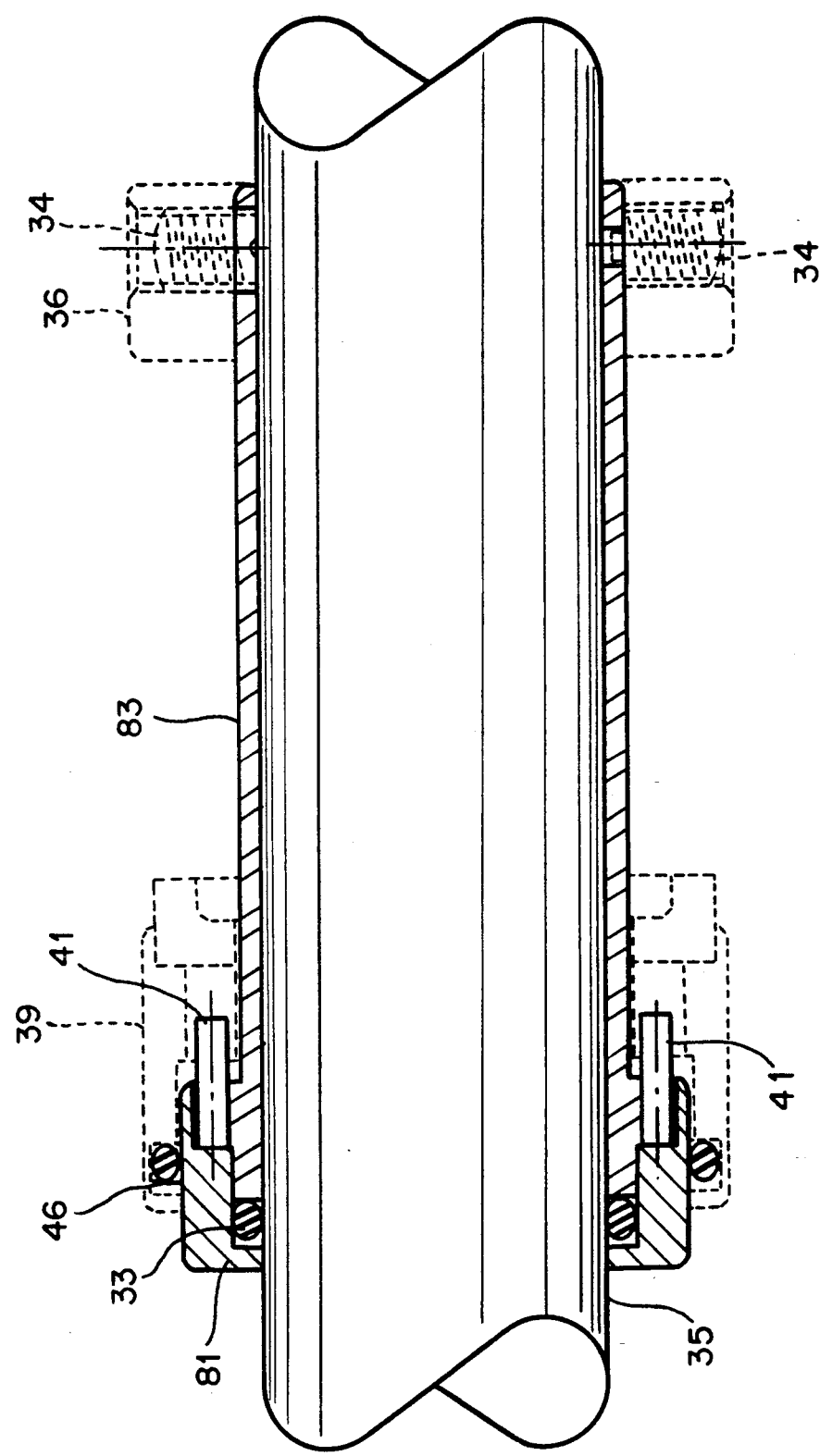
Figure 11:
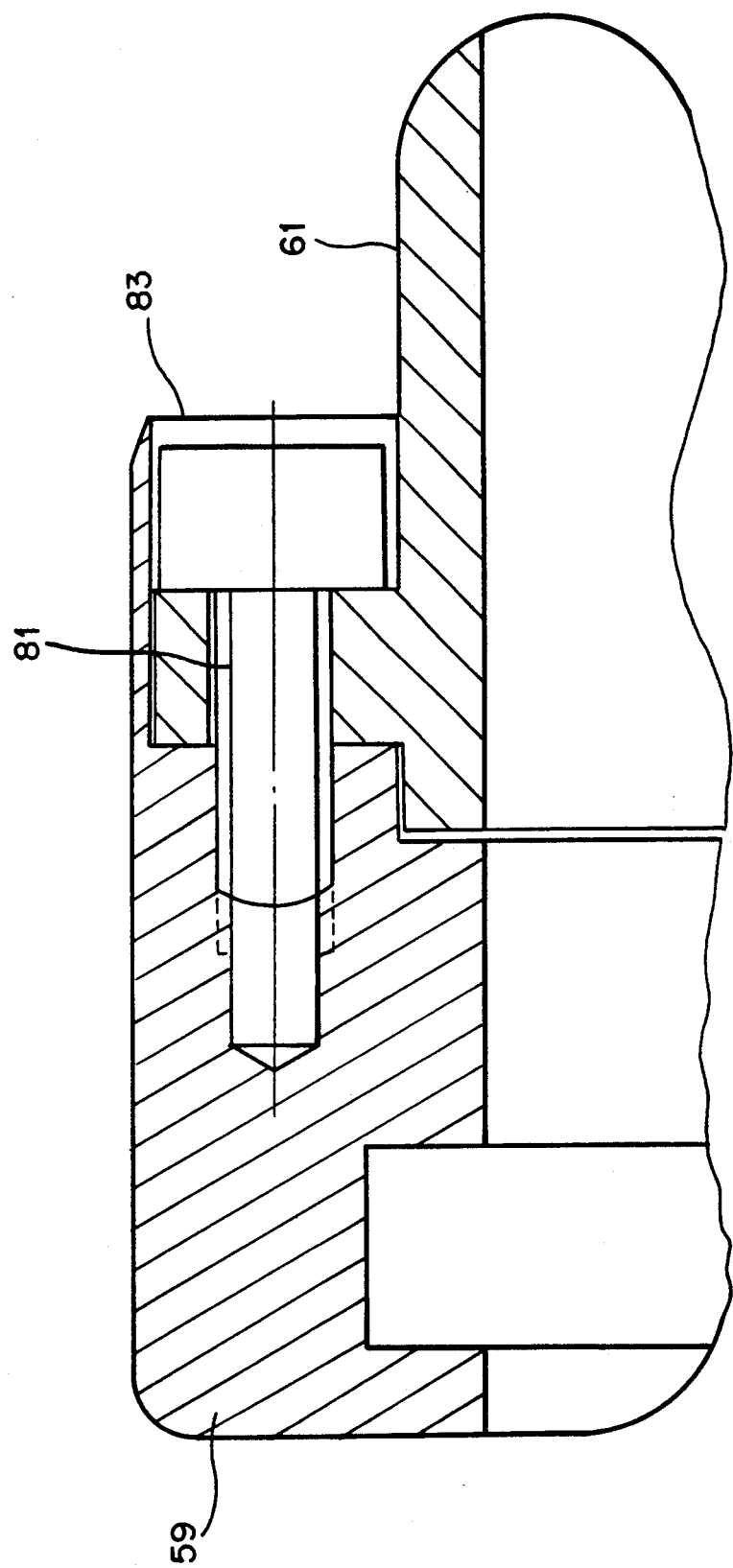
Figure 12:
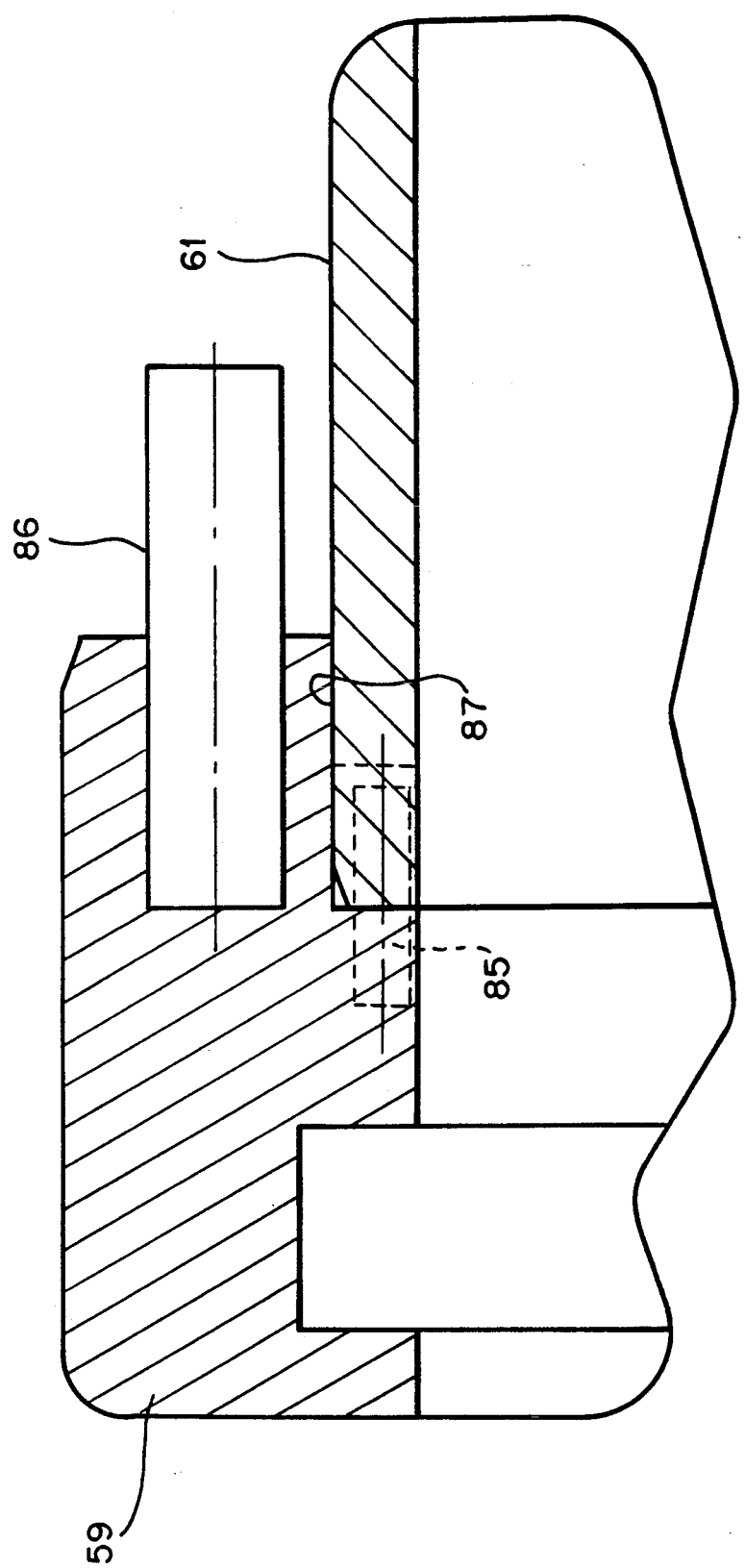

FIGS. 9A-9D compares a bi-metal seal sleeve, in accordance with the invention, with a standard sleeve;

FIG. 10 shows a bi-metal cartridge seal sleeve in accordance with the invention, fitted around a rotating shaft;

FIG. 11 illustrates a bolted bi-metal sleeve;

FIGS. 12 and 13 illustrate bi-metal sleeves in which the two components are shrunk-fit together;

FIG. 14 shows an arrangement similar to that shown in FIG. 12 but with a somewhat modified design;

FIG. 15 shows a further modification of the FIG. 12 arrangement;

FIG. 16 shows a cartridge seal in accordance with the invention, incorporating a bellows unit; and FIG. 17 shows a further example of a cartridge seal in accordance with the invention.

Figure 1:
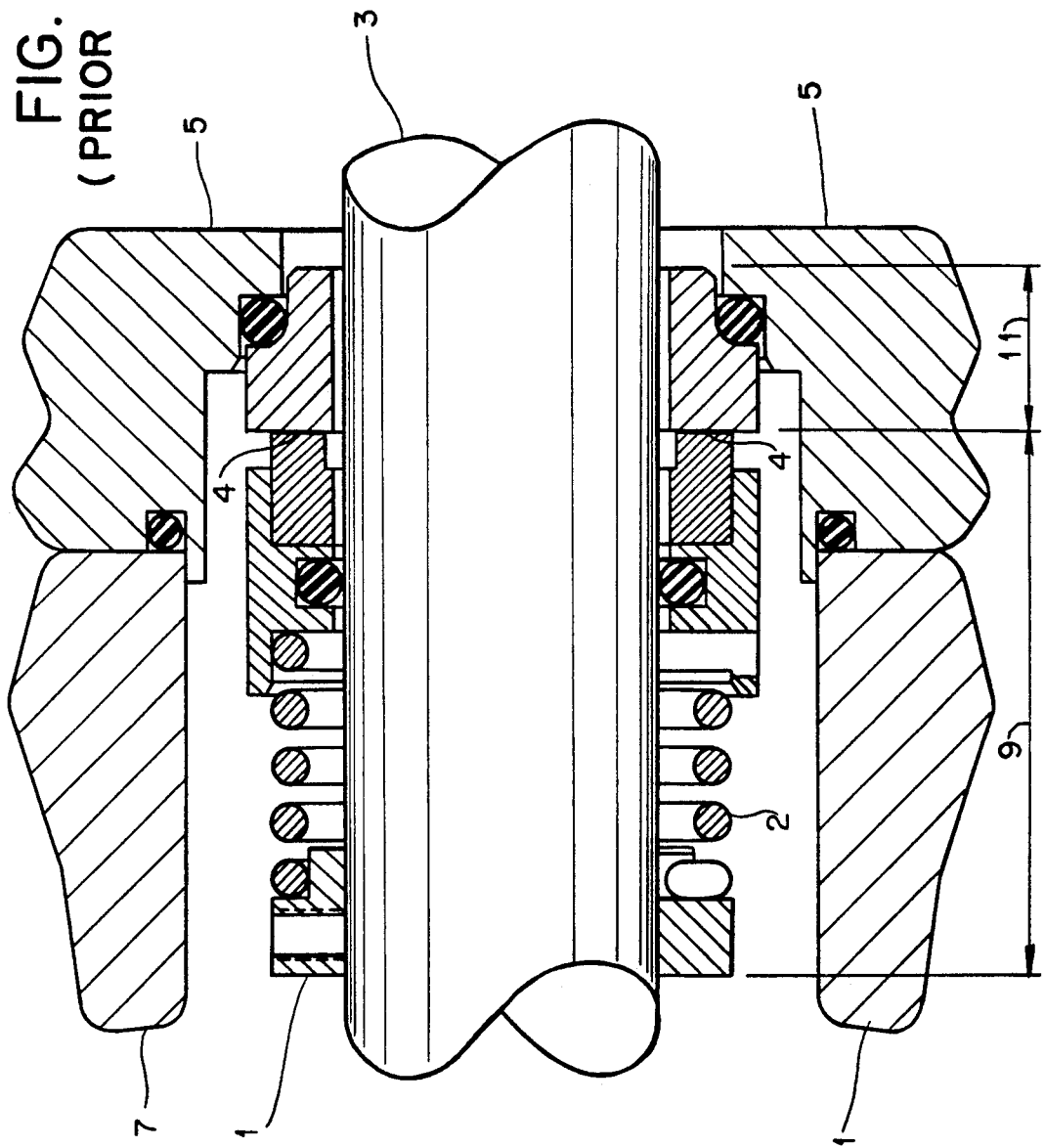
FIG. 1 illustrates a traditional multiple-component mechanical seal.

Referring to FIG. 1 of the accompanying drawings, a typical traditional multiple-component seal 1 is shown in position between a rotatable shaft 3 and a gland-plate 5 which in turn is connected to the casing 7 of the equipment, for example, a pump, being sealed. The mechanical seal 1 includes rotary components 9, which rotate with shaft 3, and stationary components 11, fixed relative to gland plate 5. Spring 2 acts against the rotary components and assists in keeping the rotary and stationary seal faces together at 4.

Figure 3:
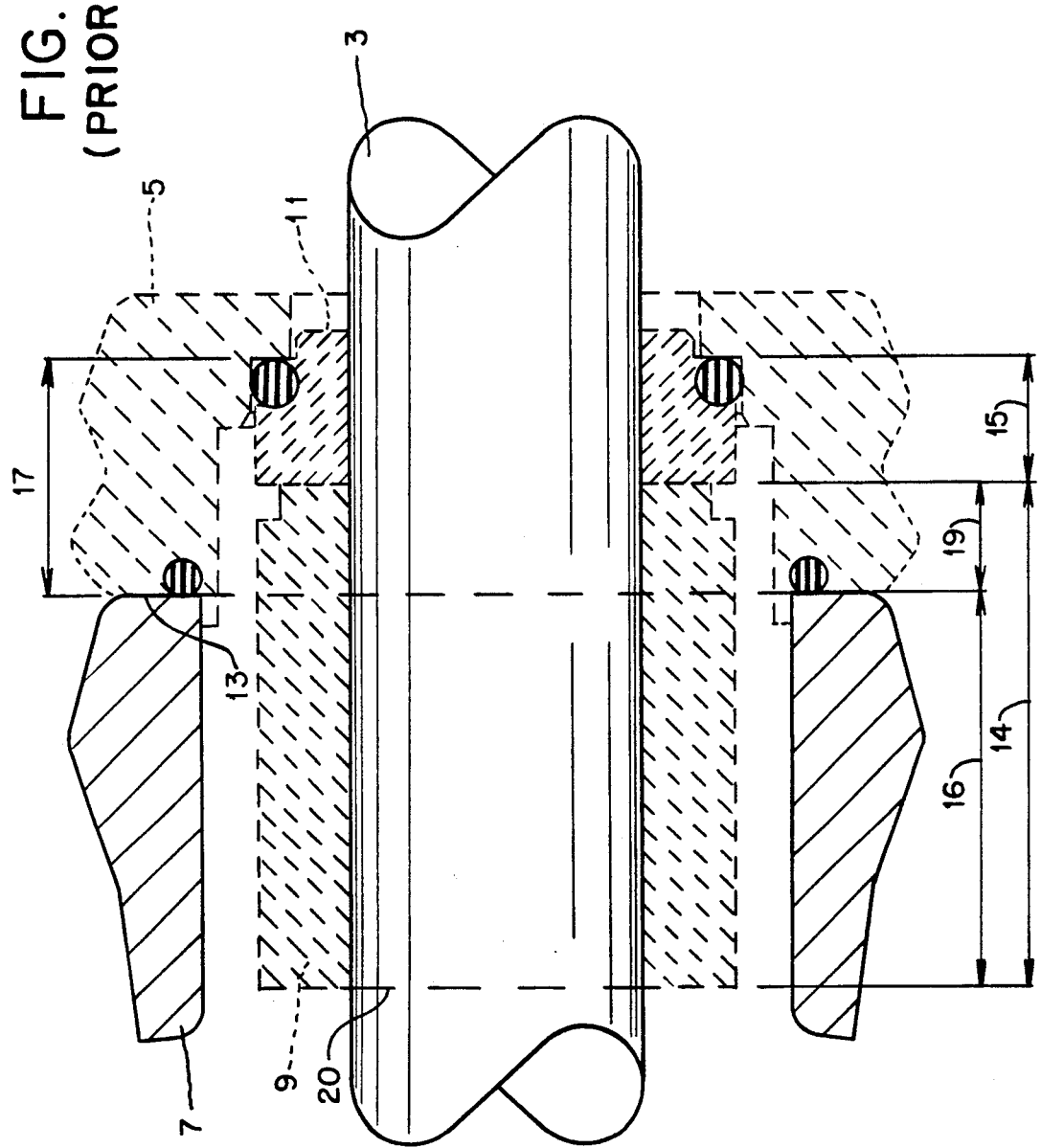
FIG. 3 illustrates the setting of a non-cartridge mechanical seal such as is shown in FIG. 1.

Seal assemblies such as that shown in FIG. 1 are difficult to fit correctly. It is necessary to set the seal to its correct working length and also to protect the seal components (to avoid soiling and damage) during assembly. The steps in fitting the seal (illustrated diagrammatically in FIG. 3) usually include:

1. a full visual dimensional check on both the shaft 3 (or sleeve) and gland plate 5 to ensure that the equipment is suitable for the seal and stationary selected;
2. checking the manufacturer's data to establish the rotary (14) and stationary (15) working lengths;
3. establishing a datum point on the shaft 3 so that the setting distances can be calculated. This is usually done by partially assembling the equipment casing 7 and marking the datum on the shaft in line with the stuffing box face 13 (see FIG. 3). The casing then has to be removed for subsequent shaft measurements and seal fitting;
4. the point at which the stationary face lies with respect to the shaft datum has to be calculated by comparing the stationary working length 15 to the stationary setting distance 17 (allowing for any gasket allowance necessary). This is usually termed the stationary setting offset (19);

5. once the stationary setting offset is determined, the rotary setting length 16 is calculated by comparing the rotary working length 14 to the stationary offset value 19. This enables the seal setting reference line 20 to be marked on the shaft;
6. fitting the stationary assembly 11 into the gland plate 5 and sliding it over the shaft 3, ensuring that the stationary assembly is protected from falling apart, from dirt and from mechanical damage;
7. sliding the seal rotary assembly 9 onto the shaft 3 and securing the rear of the seal in line with the seal setting reference line 20;
8. re-positioning the casing 7 (and the rest of the equipment in the final running position); and
9. removing any protective covering from the seal assembly and securing the gland plate casing.

When fitting non-cartridge type mechanical seals in this way, great care has to be taken to protect the seal faces. These are particularly prone to damage, mainly because of the mechanical properties of seal-face materials commonly used, which tend to be hard but somewhat brittle.

Figure 2:
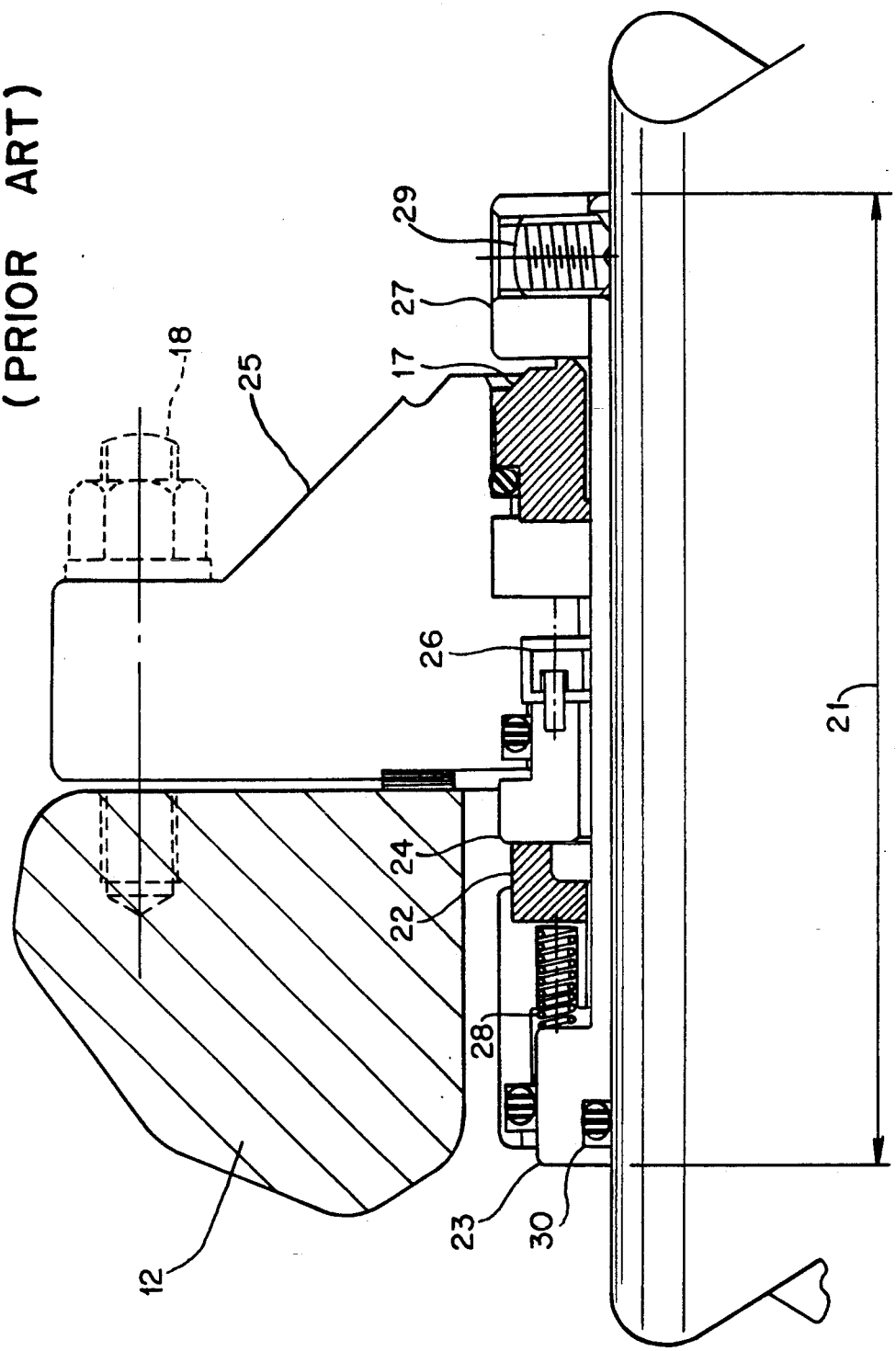
FIG. 2 illustrates a typical cartridge-mounted mechanical seal.

Although designs can vary, a typical cartridge-mounted mechanical seal is shown in FIG. 2. This seal 21 includes a cartridge or sleeve 23 on which all the other components of the seal are mounted.

Rotary seal face 22 is in contact with stationary seal face 24, which latter is mounted about pivot pins set in pivot ring 26, to ensure its alignment with rotary seal face 22 at all times (i.e. the seal includes a so-called self-aligning stationary). Springs 28, located in radially spaced, longitudinal bores between sleeve 23 and the rotary unit, also assist in maintaining the two faces 22 and 24 in contact with one another by urging face 22 in a direction towards 24.

The seal has its own gland plate 25, which is secured to the casing 12 of the equipment in which the seal is being used by means of gland bolts such as 18. The clamping arrangement, for clamping the seal in place in the equipment, includes clamp ring 27 and drive screw 29, and is situated on the outside of the seal (i.e. the side remote from the fluid being sealed) for easy access. Shaft O-ring seal 30 sits between sleeve 23 and a rotatable shaft around which the sleeve is mounted, in a groove provided in the sleeve.

The seal 21 is also provided with an in-built setting device 17.

It has been found that a significant amount of premature seal failure can be attributed to mis-handling or incorrect fitting of mechanical seal parts. Cartridge-mounted mechanical seals such as that shown in FIG. 2 are factory assembled in preset units which do not require the taking of installation measurements when fitted. Typically, it is only necessary, when fitting cartridge seals, to carry out a visual and dimensional check on the rotatable shaft around which the seal is being fitted, and then to fit the cartridge seal unit and assemble the rest of the equipment. Although care must be taken when fitting any mechanical seals, cartridge seals are less likely to be damaged during installation than are multiple-component seals. There is also no chance of either the seal being assembled incorrectly, since it is factory-assembled, or of face damage occurring, due to the springs (28 in FIG. 2) which hold the seal faces (22 and 24) in contact with each other.

Figure 4:
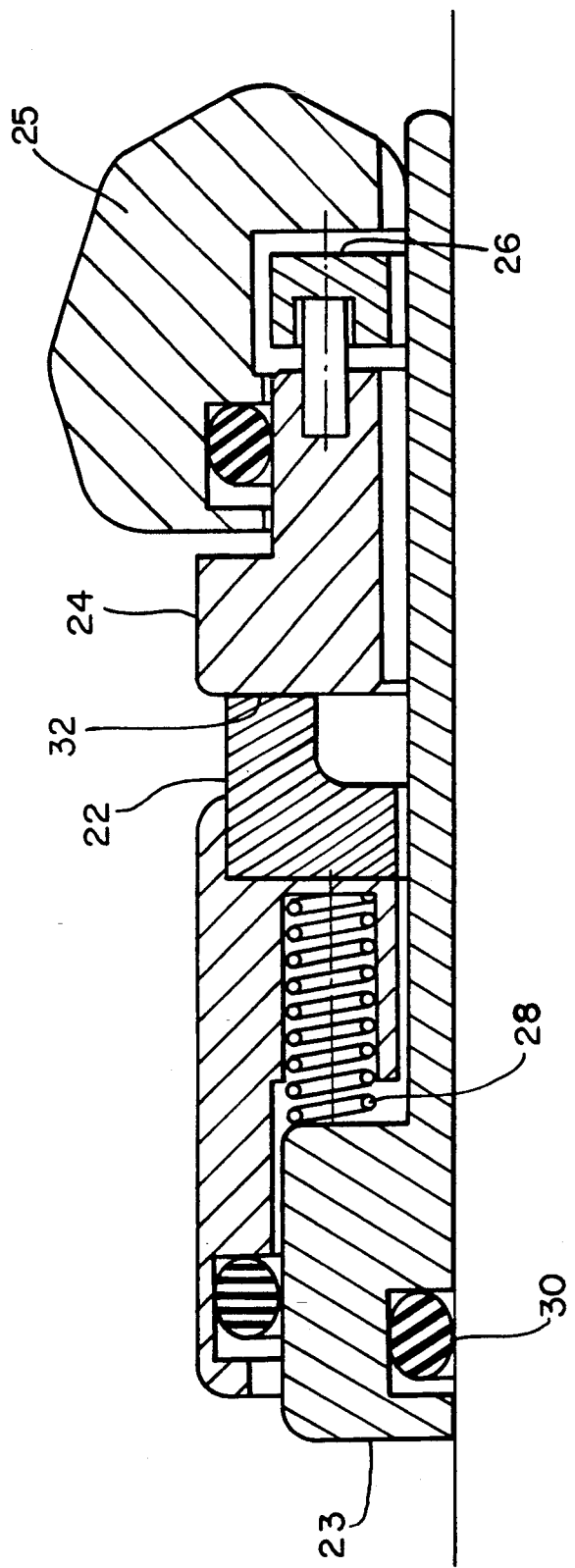
FIG. 4 shows the seal-face contact in the cartridge-mounted seal of FIG. 2.

FIG. 4 shows in more detail the seal-face contact in the seal of FIG. 2. It can be seen how springs 28 are used to provide sufficient force, against the rotary components of the seal, to maintain even contact at all times between the faces 22 and 24 (at the interface labelled 32 in FIG. 4).

Typically, cartridge-mounted mechanical seals are manufactured using 316 Stainless Steel sleeves. Stainless steel provides reasonable chemical resistance and is also readily available in standard thick wall tube, making the manufacture of the sleeves easier than is the case with metals in solid bar form. The national standard, BS 6258 Hollow Steel Bars for Machining, gives a full listing of thick wall tube sizes available from steel stockists. Most of the sizes listed are suitable for manufacturing cartridge seal sleeves.

Figure 5:
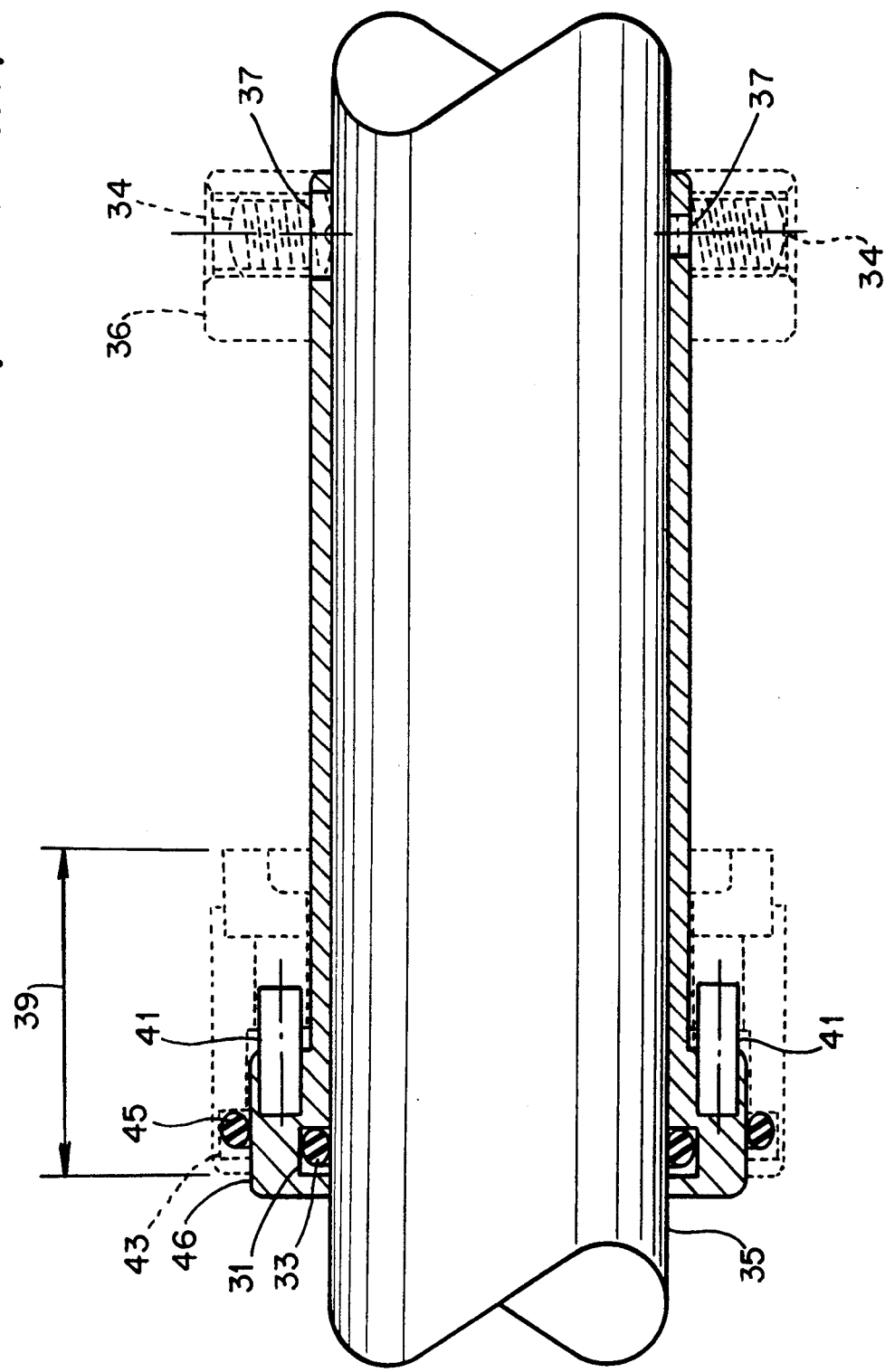
FIG. 5 illustrates in detail a typical cartridge seal sleeve.

A typical sleeve is shown in FIG. 5. It normally includes a shaft sealing groove 31 which, in use, accommodates an 'O' ring seal 33, to prevent leakage between the sleeve and the rotatable shaft 35 around which it is mounted. Drive and location screws 34, passing through clamp ring 36, secure the seal sleeve to the shaft, and drive and location holes or slots 37 ensure that the sleeve is fixed firmly to, and rotates with, the shaft. Such holes or slots are normally situated on the outside of the seal, that is to say, on the atmosphere side, for easy access.

A rotary seal face 39 (shown in dotted line) is in driving engagement with two drive pins 41, which ensure that the seal face rotates in conjunction with the seal sleeve/shaft combination. Rotary seal face 39 is provided with an 'O' ring groove 43 for accommodating 'O' ring 45 to provide sealing of the seal face at surface 46.

Although designs may vary, cartridge seal sleeves are usually at least 2.5 inches long with an inside diameter of between 1 and 5 inches, depending upon the size of the shaft on which they are to be mounted. A sleeve such as that shown in FIG. 5 would normally be manufactured from a piece of material (selected from a BS 6258 tube) by carrying out the following operations:
  internally boring out the through bore and shaft sealing device groove;
  turning the rotary seal face sealing surface;
  re-setting the sleeve in a chucking device clamping onto either the through bore or rotary seal face sealing surface;
  turning the smaller longer slender outside diameter;
  drilling radial holes for the drive screws;
  drilling the smaller radial location screw holes;
  drilling the axial holes for the rotary seal face drive mechanism (pins 41 in the particular sleeve of FIG. 5).

In practice, it may also be necessary to provide several roughing cuts for turning and boring, and holes may also require additional flat bottoming or countersinking.

Although manufacturing such a sleeve is fairly complex, 316 Stainless Steel is widely used in industry. Cutting tool tip technology, high-performance cutting fluids and improvements to machine-tool design mean that sleeves can, in fact, be produced quite easily out of 316 Stainless Steel. The main problems which are encountered relate to drilling the drive pin holes, which requires long, small diameter drills, and boring out the shaft sealing device groove (31).

Due to the success of cartridge seals and the ever-increasing sealing demands made by the process and chemical industries, new seal designs and applications are increasingly being sought. Designs now range from cartridge-mounted double mechanical seals, for extra safety in sealing toxic/hazardous products; cartridge seals with bearings to provide additional rotating shaft support; and cartridge seals with non-metallic wetted parts for use with highly corrosive products.

Figure 6:
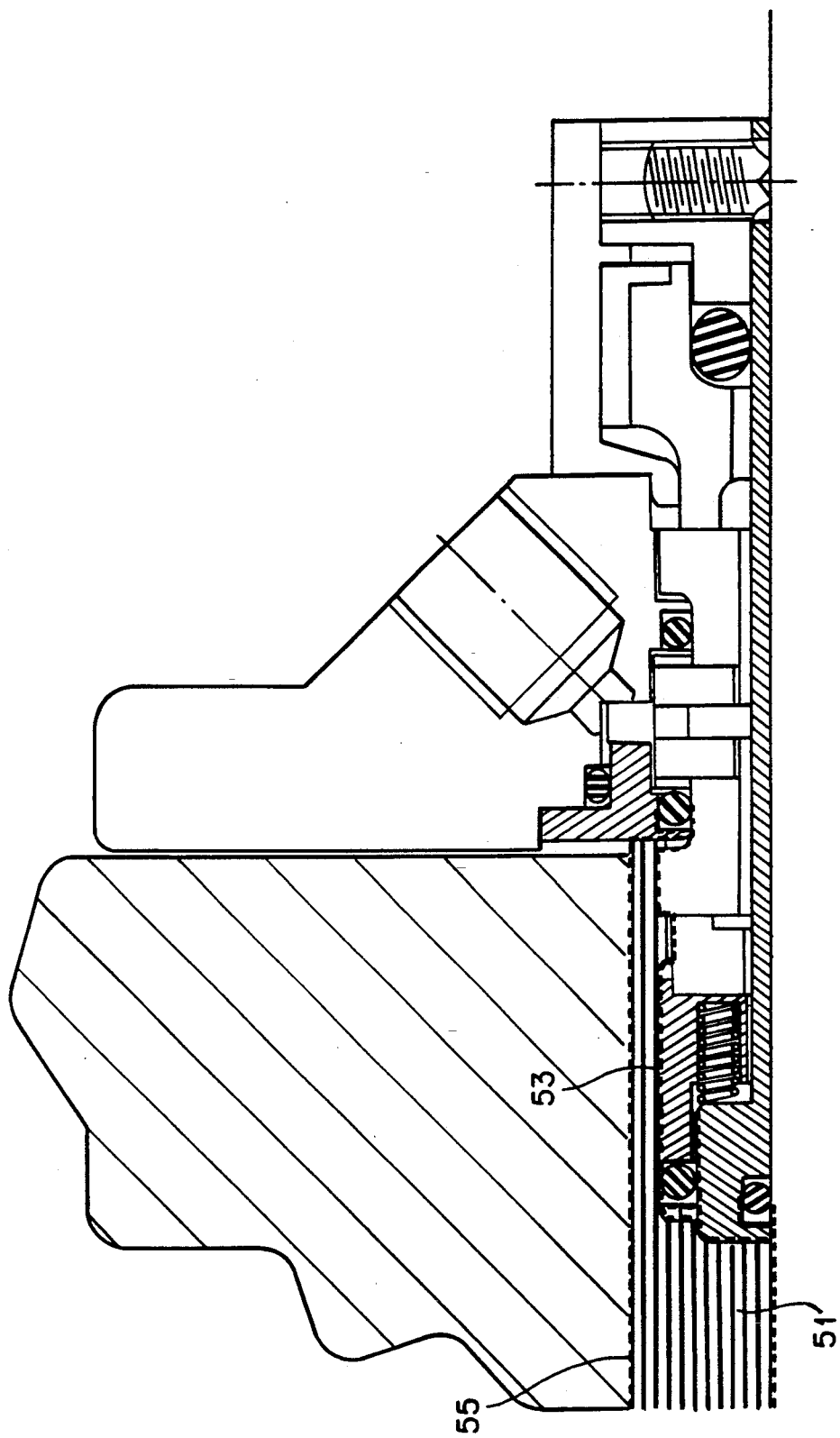
FIG. 6 shows a cartridge seal having non-metallic wetted parts.

Although cartridge seals for use in highly corrosive conditions are described as having "non-metallic wetted parts", the material actually used for the "wetted parts" is normally a high nickel content special (or exotic) alloy. Alloys which are used include Hastelloy B or C, Monel, Nickel 200 and Carpenter 20. The actual seal faces would typically be of carbon, alumina, ceramic or silicon carbide. FIG. 6 illustrates what is meant by "wetted parts" in a cartridge seal and also shows those components of a seal which have previously been thought to need "exotic metallurgy" to provide increased chemical resistance if the product being sealed is corrosive. Reference numeral 51 indicates the product being sealed, 53 regions of the seal made from an exotic alloy. The bold dashed line 55 shows the perimeter of wetted parts which lies in direct contact with the product 51. The seal sleeve shown in FIG. 6 is manufactured in the same manner as the stainless steel sleeve mentioned above.

Figure 7:
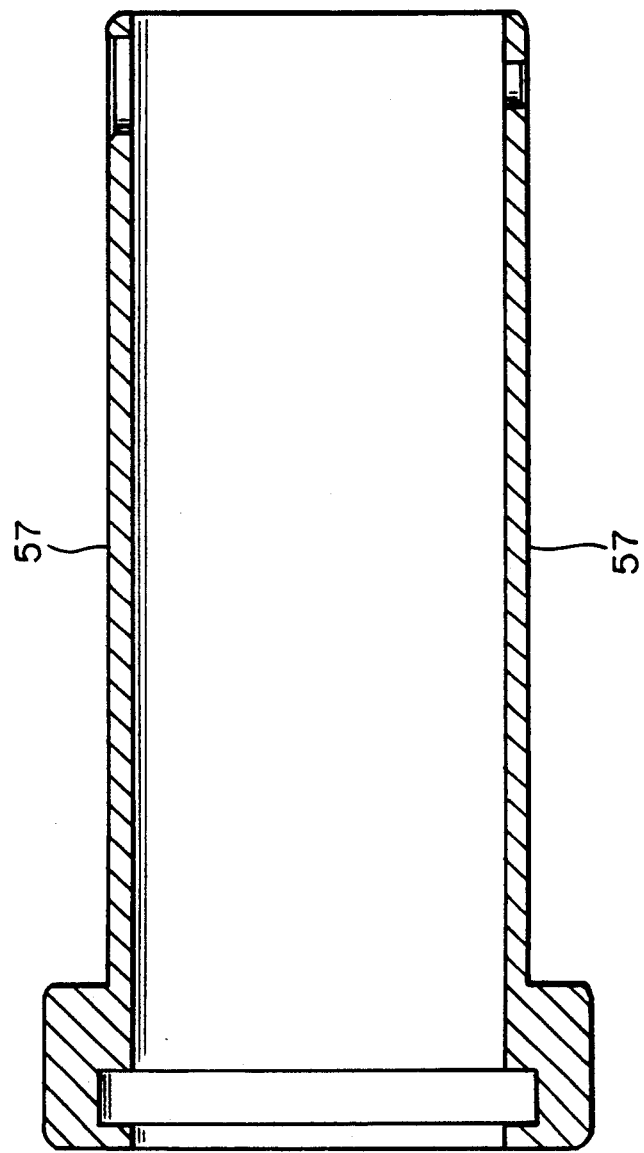
FIG. 7 illustrates the relative amounts of material wastage in forming a cartridge seal sleeve from stainless steel and from an exotic alloy.

The exotic alloy is normally about ten times the price of stainless steel and is only available in solid round bar form, in very few sizes (e.g. 25 mm, 40 mm, 50 mm, 60 mm, 75 mm and 100 mm outside diameters). FIG. 7 illustrates the wastage of material when making a seal sleeve 57 from exotic material relative to that for 316 Stainless Steel. Typically, three times as much material is wasted in producing the exotic-material version. Furthermore, an exotic alloy sleeve takes over three times as long to produce as a stainless steel sleeve. Although part of this time is taken up removing the extra material in the through bore, exotic alloys also have much lower cutting speeds and, accordingly, turning and boring takes much longer than with stainless steel.

For a cartridge seal with non-metallic wetted parts, the cost of manufacturing the seal sleeve has a significant effect on the overall price of the seal. In accordance with the present invention, a sleeve is therefore provided which is formed from two different materials, for instance, an exotic alloy for the wetted sleeve parts and 316 Stainless Steel for the remainder of the sleeve. Such a sleeve is cheaper to produce than one made entirely from an exotic alloy.

The exotic alloy is chosen according to the specific application to which a seal incorporating the sleeve will be put. Some materials are suitable for use with very acidic products, but not strong salt-water solutions, and others are suitable for use with strong bases but not acids.

Since the first and second components of the sleeve provided by the invention will usually both be metallic, such a sleeve is referred to hereafter as a "bi-metal sleeve".

Figure 8:
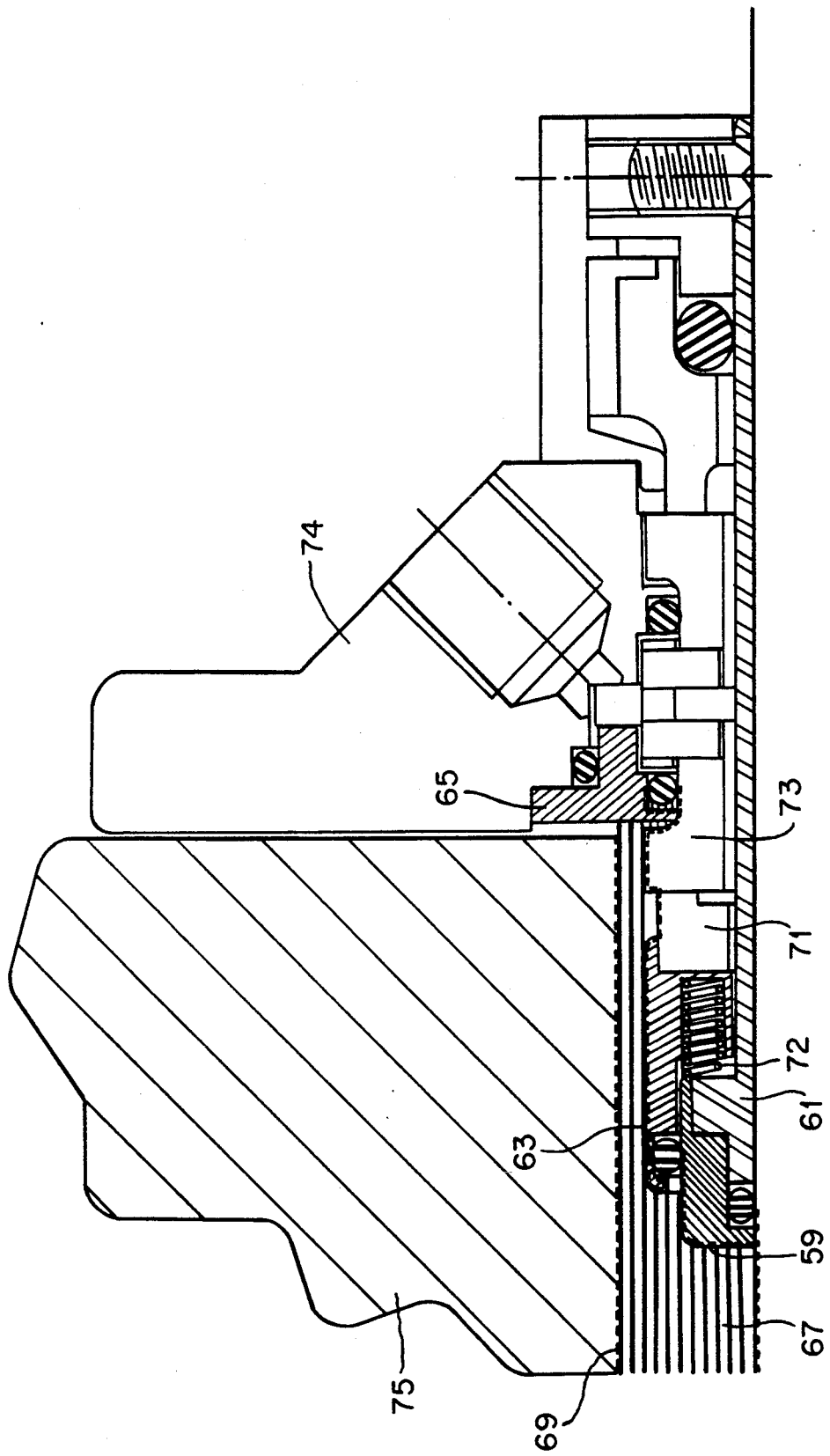
FIG. 8 illustrates a cartridge seal in accordance with the invention, including a bi-metal sleeve and non-metallic wetted parts.

An example of a cartridge-mounted seal, incorporating such a bi-metal sleeve in accordance with the invention, is shown in FIG. 8. The sleeve comprises a first component 59 made from an exotic material, and a second component 61 made from 316 Stainless Steel or a similar product. Other "wetted parts" 63, 65 of the seal are also made from an exotic material, and the perimeter of parts in direct contact with the product 67 to be sealed is indicated by the bold dashed line 69.

The seal has a rotary seal face 71, urged into mating contact with stationary seal face 73 by the action of springs 72. Integral gland plate 74 is secured to the casing 75 of the equipment in which the seal is installed (securing bolts not shown).

The seal of FIG. 8 can be directly compared with that of FIG. 6, which is the standard, single-material, sleeve arrangement.

FIGS. 9A–9D are a comparison of a standard single-component sleeve for a cartridge seal and a bi-metal sleeve in accordance with the present invention. Components labelled 77 are made from 316 Stainless Steel or a similar material, those labelled 79 from a suitable exotic material. Sleeve 80 may be made of either, but is of a single-material construction.

FIG. 10 shows a bi-metal sleeve and contacting components (in dotted line) of the remainder of a seal incorporating the sleeve. This drawing can be compared with FIG. 5 which shows a standard sleeve arrangement. Reference numerals used in FIG. 10 correspond to those used in FIG. 5, additional references 81 and 83 being to the exotic material and stainless steel parts respectively of the sleeve. It will be appreciated that all the original sleeve functions are unaffected by the use of a bi-metal design.

In FIG. 10, a grub screw 34 is shown clamping directly onto the shaft 35 via the clamp ring 36. However, other drive options, using other screw clamps (e.g. dog points or cap head screws), either directly onto the shaft or onto the sleeve, are possible. Other drive mechanisms may include keyways. The location shown shows a dog point screw via the clamp ring. Other locations include 'O' rings, circlips or setting clips.

Although an 'O' ring 33 is shown as the shaft sealing device, other seals could be used, including rings of square cross section or wedge cross section, or some form of flat sealing device.

Numerous methods may be used to drive the rotary unit. In the arrangement shown in FIG. 10, pins 41 located in the sleeve transmit drive to the rotary via slots (or holes) in the rotary unit. In another arrangement, the sleeve may be provided with slots or holes and the drive pins situated in the rotary unit. Further embodiments may include key drives, splines or dimpled devices. Although any such arrangements could be used in seals in accordance with the present invention, it is preferred that the drive mechanism be provided on the keeper component, for instance the 316 Stainless Steel component.

The two components of a sleeve in accordance with the present invention may be joined together in different ways. One possibility is to weld them together. This may not, however, be the preferred method because any weld is likely to suffer from fatigue and stress corrosion in service and, as a result, additional stress-relieving techniques may be required. There are also a number of other factors which limit the use of this joining technique, as follows:

- due to the thin cross sections encountered in sleeve designs, the heat of the welding process could cause distortion. Additional machining operations may therefore be necessary to correct warping, etc.;
- joining dissimilar materials by welding is a specialist, and thus expensive, process;
- different specialist welding techniques would have to be employed for the different exotic materials used. This would further increase costs and could lead to different 316 sleeve parts having to be stocked (with different welding preparations such as fillets and gaps);

welding is a permanent joining technique and limits the possibilities of refurbishing a used sleeve.

Although bolting together the two components of a bi-metal sleeve would not result in the above-mentioned problems, there are other problems associated with bolting.

Referring, for instance, to the dimensions of the sleeve shown in FIG. 7, the space for the bolt head would be less than 3/16" and this is without allowing for clearance. Typically, an M2 Cap Head screw requires a counter-bore of 4.4 mm (0.173") for fitting, and this would make the assembly weak unless a large number of screws were used. FIG. 11 shows part of a bi-metal sleeve similar to that shown in FIG. 8 (corresponding reference numerals used), in the region where the first and second components are joined together by means of bolt 81. The sleeve face 83 into which the bolt is driven can be seen to be the face on which drive pins, springs, etc (see FIGS. 8 and 10) are located, which further restricts the sleeve design.

In addition, screw threads are subjected to shaft movements and vibration which can make the threads loosen during operation of the seal. They can also be affected by shaft rotation (a shaft turning in one direction tends to tighten the screw thread but if the direction is reversed, it tends to loosen the thread) which means that some form of locking device is required. Mechanical thread locking normally involves more counter-boring operations and the use of extra fasteners such as locking washers. Due to tight space limitations, this type of locking may cause design complications. Although industrial adhesives could be used for thread-fastening, these are normally regarded as semi-permanent and would probably cause problems when disassembled for refurbishing is required.

A preferred method of connecting together the two components of a bi-metal sleeve in accordance with the present invention is by means of shrink-fitting. One method of shrink-fitting a bi-metal sleeve involves the production of a uniformly tubular stainless steel part and pressing it into a suitably sized bore in the exotic alloy sleeve end (the first component). FIG. 12 illustrates a typical shrunk-fit sleeve (reference numerals as for FIG. 8), having an interference fit 87. Drive pin 86, for engagement with a rotary unit of a seal, is mounted in first component 59. However, as a result of the shrink-fit method used to produce the sleeve, the shrink-fit interference will, in effect, form part of the seal drive to the rotary unit and, accordingly, additional drive pins (such as 85) may be required for applications which require high torque/drive.

A preferred arrangement involves the inclusion of the drive pin in the stainless steel component 61 of the sleeve, as illustrated in FIG. 13. Here, the shrink-fit is no longer part of the drive mechanism. However, the drive pins 86 would still have to be drilled (and flat bottomed) using a long drill. A further drilling problem is that the outside diameter tends to push out where the pins are fitted and, because this is a shrink-fit diameter, a finish turning operation is required after pin fitting. Furthermore, the limited radial cross section is such that the interference fit between the two components tends to make the exotic alloy push out. This diameter is also used as the rotary seal face sealing surface (see FIG. 5) and accordingly, another finishing operation is required after fitting to ensure that the sealing surface is to its correct specification as to size and surface finish. Both these problems are overcome by turning a further diameter for the shrink fit. The pin-holes can then be drilled with shorter drills from the other end and the increased wall thickness means that the rotary face sealing surface is unaffected by shrink-fitting. If sufficient clearance (89 in FIG. 14) is left between the two materials, re-machining is not required after the pins are fitted. This arrangement is illustrated in FIG. 14, and the only problem with it is that the exotic material has to have a groove (88) bored out to a tight tolerance to accommodate the shaft sealing device (usually an 'O' ring).

A further consideration is that the interference bore size requires machining to a similar tight tolerance. In a particularly preferred arrangement, illustrated in FIG. 15, the 'O' ring groove 91 is formed partly by the exotic alloy component 59 and partly by the stainless steel component 61. The single bore in the exotic alloy provides both its contribution to the 'O' ring groove 91 and the part for the interference fit 87 with the stainless steel component. Such an arrangement avoids the need for a groove which is difficult to machine in the exotic alloy. It simply has to be bored to one size. The 316 Stainless Steel portion 61 is still provided to the same geometry as for the sleeve of FIG. 14, except for some alteration to the size dimensions.

Further designs of cartridge seal, in accordance with the invention, are illustrated in FIGS. 16 and 17. In these Figures, the reference number 147 refers to the second component (typically stainless steel) of the seal sleeve; 149 to the first component (typically an exotic material) of the sleeve; 151 to the rotary seal face and 153 to the stationary seal face; 155 to the stationary 'O' ring; 157 to the sleeve 'O' ring (which will contact the equipment shaft on which the seal is mounted); 159 to the equipment casing (where shown); 161 to the gland plate of the seal; and 163 to a holder for the rotary face 151.

Referring firstly to FIG. 16, the seal shown has metal bellows 165 (of an exotic alloy) acting to urge rotary face 151 into mating contact with stationary face 153. The bellows 165 are welded directly to the rotary face holder 163 (also exotic alloy) and to the first component 149 of the seal sleeve.

FIG. 17 shows a seal incorporating a sprung stationary component 153. Springs 191 (set in radially spaced, longitudinal bores in the exotic alloy stationary holder 192) act as stationary biassing means, urging the stationary component 153 against rotary face 151, to ensure that the two remain in alignment and in contact. The seal also includes drive pin 193, to ensure that the rotary component 151 rotates in synchrony with an equipment shaft on which the seal is mounted.

The gland plate of the seal is also formed from two separate components, a main body (201) of stainless steel and an insert (203) of an exotic alloy (this arrangement is also used in the seal of FIG. 16). 205 is a gland gasket, which bears against equipment casing 159.

I claim:

1. A sleeve for a cartridge-mounted mechanical seal, the sleeve being formed from two connected-together metallic components, the first component forming one end of the sleeve and providing at least part of a groove for an 'O' ring, said first component being made from a material having relatively high chemical resistance, and a second component forming the remainder of the sleeve and being formed of a material having a relatively lower chemical resistance, the arrangement of the components being such that, in use as part of a cartridge-mounted mechanical seal, the sleeve has only its first component in contact with a fluid whose escape is being sealed.

2. A seal sleeve according to claim 1, wherein the first component of the sleeve is made from a high nickel-content alloy.

3. A seal sleeve according to claim 1, wherein the first component of the sleeve is made from a material selected from the group consisting of Hastelloy B or C, Monel, Nickel 200, Carpenter 20 and titanium.

4. A seal sleeve according to claim 1, wherein the second component of the sleeve is made from stainless steel.

5. A seal sleeve according to claim 4, wherein the second component of the sleeve is made from 316 stainless steel.

6. A seal sleeve according to claim 1, wherein the first and second components are connected together by shrink-fitting.

7. A seal sleeve according to claim 6, wherein a drive pin, for use in driving rotation of a rotary component in a seal in which the sleeve is to be used, is incorporated in the second component of the sleeve, such that any shrink-fit interference between the first and second components of the sleeve does not form part of the drive mechanism for the rotary component.

8. A seal sleeve according to claim 6, comprising a groove for a sealing ring which, in use of the sleeve in a seal, sits between the sleeve and a rotatable equipment shaft around which the seal is mounted in use, the groove being formed partly out of a bore formed through the first components for use in effecting shrink-fitting between the first and second components, and partly out of the second components after it has been shrink-fitted into the first.

9. A cartridge-mounted mechanical seal including a sleeve according to claim 1.

10. A seal according to claim 9, comprising a rotary component and a stationary component, both mounted on the sleeve, and drive means for driving the rotary component, to ensure that, in use, it rotates in synchronisity with a rotating shaft around which the sleeve is mounted in use of the seal.

11. A seal according to claim 10, wherein the drive means comprises one or more drive pins, mounted on the sleeve, which are in driving engagement with the rotary component of the seal.

12. A seal according to claim 11, wherein the first and second components of the sleeve are connected together by shrink-fitting, and wherein the drive pin(s) are mounted on the second component of the sleeve, so that the shrink-fit interference between the first and second components does not form part of the drive mechanism for the rotary component.

13. A seal according to claim 9, comprising a stationary component which is pivotally mounted in the seal so as to allow a degree of pivotal movement, when the seal is in use, of the stationary component relative to the stationary parts of an item of equipment in which the seal is mounted, about an axis perpendicular to the longitudinal axis of the seal, and hence maintain the stationary and rotary components of the seal substantially in alignment despite any out-of-squareness in the equipment.

14. A seal according to claim 13, wherein the stationary component is mounted about one or more pivot pins set in a pivot ring, the pivot ring itself being mounted about one or more pins in a gland plate or other part of the seal which, in use, remains fixed in position relative to stationary parts of the equipment, the arrangement being such as to allow the necessary degree of pivotal movement, in use, of the stationary component.

15. A seal according to claim 9, comprising a rotary component and a stationary component having adjacent faces; and biassing means acting to urge the rotary and stationary component faces into constant mating contact with one another during use of the seal.

16. A seal according to claim 15, wherein the biassing means comprises a spring or springs acting to urge the rotary and stationary component faces into contact with one another.

17. A seal according to claim 16, wherein the biassing means comprises bellows, which act to urge the rotary and stationary component faces into contact with one another.

18. A seal according to claim 17, wherein the bellows are made from a metal or metal alloy having a relatively high chemical resistance.

19. A seal according to claim 17, wherein at their end remote from the seal component against which they act in use, the bellows are welded directly to the seal sleeve at an appropriate point towards the end of the sleeve adjacent the fluid being sealed.

20. A seal according to claim 15, wherein the biassing means acts against the rotary component of the seal, to urge the rotary component face into constant mating contact with the stationary component face during use of the seal.

21. A seal according to claim 15, wherein the biassing means acts against the stationary component of the seal, to urge the stationary component face into constant mating contact with the rotary component face during use of the seal.

22. A seal according to claim 9, wherein at least those surfaces of components of the seal which, in use, come into contact with the fluid whose escape is being sealed using the seal are also made from a material having a relatively high chemical resistance.

23. A seal according to claim 9, being a double cartridge-mounted mechanical seal having both inboard and outboard rotary and stationary components.

* * * * *